Dec. 14, 1965  R. P. BOWCOTT  3,223,213
ONE WAY ROLLER CLUTCH WITH FREEING SHOES
Filed April 6, 1964

3,223,213
ONE WAY ROLLER CLUTCH WITH
FREEING SHOES
Roy Price Bowcott, Solihull, England, assignor to Joseph
Lucas (Industries) Limited, Birmingham, England
Filed Apr. 6, 1964, Ser. No. 357,546
Claims priority, application Great Britain, Apr. 10, 1963,
14,282/63
1 Claim. (Cl. 192—45)

This invention relates to unidirectional clutches of the kind comprising a plurality of rollers angularly spaced within a substantially annular gap between concentric clutch members, the adjacent peripheries of the two members being so shaped that the sections of the gap in which the rollers are respectively located are of circumferentially tapering form whereby rotation of the one member in one direction will cause the rollers to wedge within the gap and thereby drive the other member whilst free rotation of said other member in the same direction is permitted with said one member stationary.

It has previously been proposed to provide a clutch of this kind having in combination a plurality of arcuate shoes extending within said gap between adjacent pairs of rollers respectively and a plurality of springs acting respectively between stops on one of the clutch members and the shoes in a direction to urge the rollers into their wedged position, the angular length of the shoes being such that there is only a small clearance between a roller and the adjacent end of a shoe when this shoe is in contact with the next roller.

According to the present invention, a clutch of this sort is modified in that the springs act between stops on one of the clutch members and the rollers. This modification allows the arcuate length of the shoes to be reduced, so that more rollers can be employed between the clutch members. Moreover, the weight of each shoe is reduced, so that the risk of jamming at high speeds due to centrifugal forces is minimised.

Figure 1:
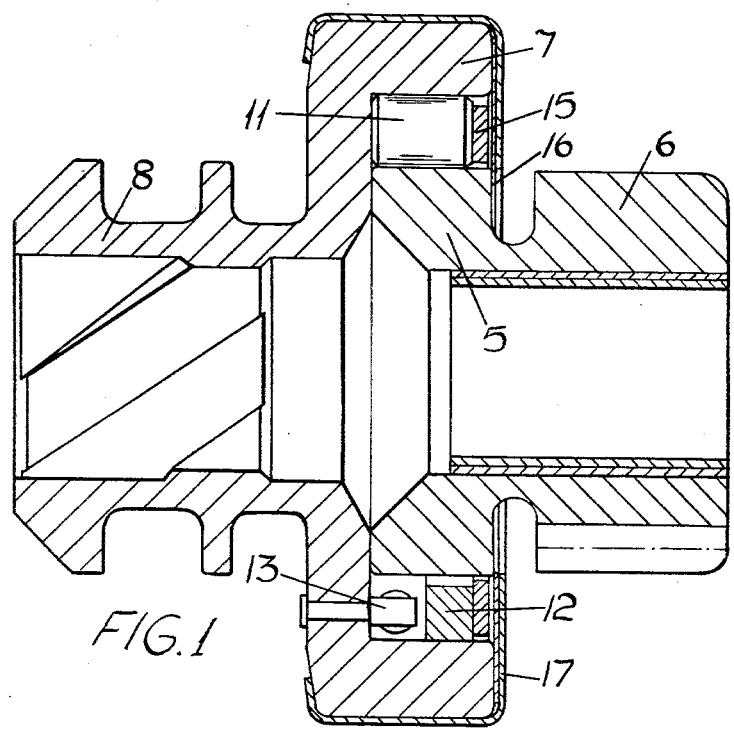
Figure 2:
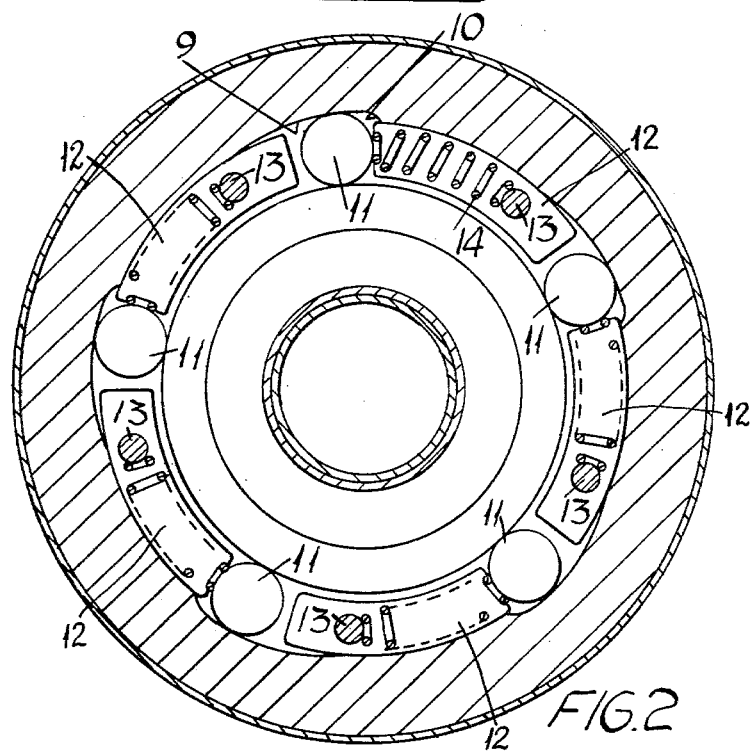

In the accompanying drawings, FIGURES 1 and 2 respectively are sectional side and end views illustrating one example of the invention as applied to a unidirectional clutch for use in an engine starting apparatus.

Referring to the drawing, there is provided a first clutch member 5 of cylindrical form on which is formed a pinion 6 adapted for engagement with a toothed wheel on the engine. Surrounding the member 5 in spaced relationship is a second concentric clutch member 7 which is formed on a part 8 adapted to be rotated by an electric motor.

The internal periphery of the member 7 is substantially cylindrical, but at five equiangularly spaced positions incorporates shallow recesses 9 which decrease in depth between maximum and minimum values and at their widest ends define shoulders 10. As a result of the shape of the member 7, the substantially annular space between the clutch members 5, 7 incorporates widened sections at angularly spaced positions adjacent the shoulders 10, the sections tapering in a circumferential direction. In the widened sections are located respectively five rollers 11 the axes of which are parallel to the common axis of the clutch members 5, 7. The diameter of the rollers is such that they can be freely accommodated in the widest sections of the substantially annular space, but will wedge in the space between the clutch members as they are moved away from the shoulders 10.

In the gaps between the rollers 11 are five arcuate shoes 12, the arcuate lengths of which are such that when the rollers are adjacent the shoulders and one end of a shoe is in contact with a roller 11, its other end will be spaced by only a short arcuate distance, for example 0.006 inch, from the adjacent roller. This distance must be less than the arcuate distance moved by the rollers between their unwedged and wedged positions.

The radial thickness of each shoe 12 is less than the diameters of the rollers 11, and the shoes are spaced from the first clutch member. Secured to the first clutch member and extending into these spaces are five equiangularly spaced pegs 13, and between these pegs and the adjacent rollers are located five compression springs 14 which load the rollers towards their wedging position in the space between the clutch members. Moreover, in contact with the shoes 12 is a retaining and sealing ring 15 which in turn is in contact with a pair of C-shaped washers 16. The assembly is held in position by a sleeve 17 surrounding the member 7, the end of the sleeve being rolled over into contact with the washers 16.

The arrangement is such that relative rotation of the clutch members 5, 7 in one direction moves the rollers 11 to the widened sections so that no drive is imparted. However, relative rotation of the clutch members in the opposite direction moves the rollers to their wedging positions to impart a drive from the driven clutch member to the other clutch member. Moreover, the spacing between the rollers and shoes is such that in the event of a roller or shoe becoming jammed in the unwedged position, relative rotation of the clutch members in said opposite direction will cause the jammed roller or shoe to become freed by an adjacent shoe. Thus, if for example the roller 11 at the top of FIGURE 2 becomes jammed in the position shown, so that it cannot move to its wedging position, then as soon as the next roller 11 considered in a clockwise direction starts to move towards its wedging positon, it strikes one end of a shoe 12 the other end of which contacts the jammed roller and frees it.

Having thus described my invention what I claim as new and desire to secure by Letters Patent is:

A unidirectional clutch comprising in combination a pair of concentric clutch members defining therebetween a substantially annular gap, the adjacent peripheries of said pair of clutch members being shaped to divide said substantially annular gap into a plurality of sections each having a relatively wide end and a relatively narrow end, a plurality of rollers located in the plurality of sections respectively, relative angular movement of said clutch members in one direction moving said rollers to said relatively wide ends of said sections so that no drive is imparted from one clutch member to the other, and relative angular movement of said clutch members in the opposite direction moving said rollers to said relatively narrow ends of said sections so that drive is imparted from one clutch member to the other, a number of arcuate shoes positioned in said substantially annular gap, there being one less shoe than roller and said shoes extending between the pairs of rollers, a plurality of stops on one of said clutch members, and a plurality of springs acting respectively between the plurality of stops and the rollers in a direction to urge the rollers towards said relatively narrow ends of said sections, each of said shoes having an arcuate length such that there is only a small clearance between a roller and the adjacent end of the shoe when the shoe is in contact with the next roller.

References Cited by the Examiner
UNITED STATES PATENTS
3,054,488   9/1962   General et al. _____ 192—44

DAVID J. WILLIAMOWSKY, *Primary Examiner.*